United States Patent [19]

LeFebvre et al.

[11] 3,908,364
[45] Sept. 30, 1975

[54] PUTTY PROPELLANT STRESS RELIEF SYSTEM

[75] Inventors: Clarence A. LeFebvre; Lewis L. Schoen, both of San Jose, Calif.

[73] Assignee: United Technologies Corporation, Hartford, Conn.

[22] Filed: Jan. 19, 1973

[21] Appl. No.: 324,940

[52] U.S. Cl................................. 60/252; 102/97
[51] Int. Cl................................... F02k 9/00
[58] Field of Search ............ 60/252, 253, 219, 255; 102/97, 99, 103

[56] References Cited
UNITED STATES PATENTS

| 3,088,274 | 5/1963 | McKinnon et al.................. 60/252 |
| 3,105,350 | 1/1963 | Eichenberger........................ 60/252 |
| 3,122,884 | 3/1964 | Grover et al........................ 102/103 |
| 3,133,410 | 5/1964 | Gessner............................... 60/219 |
| 3,306,204 | 2/1967 | Throner, Jr.......................... 60/255 |

*Primary Examiner*—Samuel Feinberg
*Attorney, Agent, or Firm*—Steven F. Stone

[57] ABSTRACT

Rocket motors utilizing putty propellants are provided with means for permitting stress relief of the propellant grain while preventing slump of the initial burning surface. This invention is applicable to both end burning and internal burning propellant configurations.

2 Claims, 4 Drawing Figures

PUTTY PROPELLANT STRESS RELIEF SYSTEM

BACKGROUND OF THE INVENTION

"Putty" propellants have been known to the rocket art for quite some time and differ from the conventional solid propellant in that the binder system for the oxidizer and other fuel materials is not a crosslinked or vulcanized material. Putty propellants consist of a mixture of a solid oxidizer material in a relatively high viscosity binder and since the binder is not crosslinked, the putty propellant is capable of flowing in a nonelastic manner. The distinction between "solid propellants" and "putty propellants" is not sharply defined. For the purposes of this invention, it is not necessary to make any such clear demarcation since even conventional solid propellants exhibit the characteristic known as "slump" in which the configuration of the grain changes over a period of time in response to a long duration load such as is induced by gravity, for example. Thus, while the system of this invention is directed primarily to putty propellants in which the slump characteristic is more pronounced due to the greater tendency of putty propellants to flow, it is also applicable to solid propellant systems in which slump over extended periods of time may also be a problem. Thus, as used herein, the term putty propellant will encompass not only the true nonelastic putty propellants but also "pseudo" putty propellants which are propellants subject to slump but also exhibiting some degree of elasticity. Putty propellants have a distinct advantage over solid propellants in that they do not require the use of any curing agent to form the binder network. This permits the propellants to be formulated at higher solids loadings than could be obtained with a solid propellant and also permits the use of various high energy ingredients which could not be put into a solid propellant due to their adverse interreactions with the curing agents employed to crosslink the binder. Because of the strong tendency of putty propellants to slump, their use heretofore has been confined primarily to systems in which the putty propellant is extruded or otherwise caused to flow into a combustion chamber, in a manner similar to liquid propellant systems. They have not been used in a manner similar to a solid propellant where the propellant is stored and burned in the form of a grain of a particular configuration. The extra weight of the apparatus needed to cause putty propellants to flow into a combustion chamber have substantially limited its application. According to this invention, however, means are provided by which a putty propellant rocket motor can be operated in a manner completely analogous to a solid propellant rocket motor either in an end burning or an internal burning configuration while preventing slump and permitting stress relief of the propellant.

It is accordingly an object of this invention to provide a putty propellant rocket motor capable of burning in a manner analogous to a solid propellant rocket motor.

It is another object of this invention to provide a method for preventing slump of flowable propellants in a rocket motor.

It is another object of this invention to provide a means for relieving the stresses built up within a flowable propellant as a result of changes in temperatures or pressures to which it is being subjected.

These and other objects of the invention will be readily apparent from the following description with reference to the accompanying drawings wherein.

DESCRIPTION OF THE INVENTION

The objects of this invention are obtained if the putty propellant is retained within the rocket motor by means which function to (a) prevent the initial burning surface of the propellant from changing its configuration during storage as a result of slump, and (b) permit axial motion of the propellant within the rocket motor to relieve stresses built up within the propellant. These means must either be ejectable or consumable upon ignition of the rocket motor or otherwise rendered nondetrimental to the operation of the rocket motor.

Figure 1:
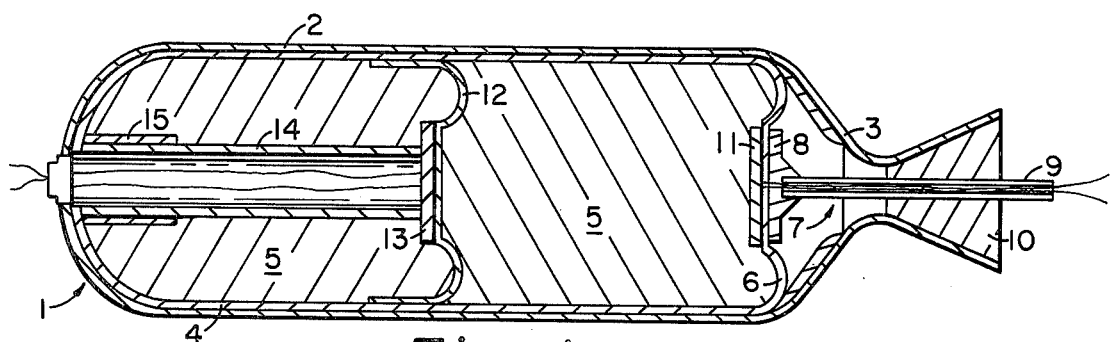
FIG. 1 is a cross section through an end burning rocket motor illustrating an embodiment of this invention.

Referring now to FIG. 1, a simple end burning rocket motor illustrating an embodiment of this invention is shown. This embodiment clearly illustrates the differences between this invention and such prior art systems as are shown in U.S. Pat. No. 3,121,993 and 3,583,162 which only provide slump prevention without stress relief of the propellant grain. The embodiment of FIG. 1 comprises a rocket motor 1 having a pressure vessel 2 provided with exhaust means 3 affixed to the rearward end thereof. The pressure vessel 2 has thermal insulation 4 on its internal surface which in this particular embodiment is shown as a rubber receptacle having a putty propellant 5 therein. The aft end of the receptacle 4 is sealed by a means which permits longitudinal or axial expansion and contraction of the propellant 5 which means, in this embodiment, are illustrated by an annular convolute 6 on the end of the receptacle means 4, the convolute 6 having a rearwardly extending convexity. The convolute 6 completely covers the end of the propellant providing a nonleaking air seal. In addition, antislump means 7 are provided to maintain the initial burning surface of the end burning propellant grain in a proper nonslumping position during storage. The antislump means 7 of this embodiment comprises a support member 8, preferably of a combustible, which is maintained in proper alignment on the end surface of the propellant grain 5 by means of a support and tube 9 running through a plug 10 mounted in the exit cone of the nozzle. The tube 9 is free to slide longitudinally within plug 10 to permit expansion and contraction of the propellant 5 and/or case 1 in response to variation in temperatures or pressures, for example, and the hole through plug 10 within which tube 9 is mounted is of sufficient length to maintain the orientation of the support means on the propellant grain. The tube 9 in this embodiment also carries the wires required to ignite the igniter 11 which is illustrated as a mass of pyrotechnic material located within the propellant at the initial burning surface. As an optional feature, the embodiment of FIG. 1 is capable of operation in a multi-pulse mode. After ignition of the initial burning surface by means of igniter 11, the hot combustion gases will cause the expulsion of the nozzle plug 10 together with the combustion and expulsion of the antislump means 7. After the propellant has burned down to the combustion barrier 12 formed from an insulating material such as rubber and which may be integral with receptacle 4, combustion will cease. A subsequent ignition of igniter 13 will cause combustion of the remaining grain. The normal time duration between pulses in such a rocket motor is normally sufficiently short so that slump of the new burning surface 13 is not a problem and additional slump support means would not be required in those systems in which the viscosity of the propellant 5 is adequate for the short time periods. In those low viscosity systems which would require some slump support, the igniter 13 could be mounted on a tube 14 which in turn is slidably mounted in a support structure 15 at the forward end of the system. Ideally, the tube 14 and the support 15 would be formed of some readily conbustible material and would be consumed in the operation of the device.

During the operation of this type of end burning rocket, the propellant is subject to substantial forces both through vibration and g loads. These forces will tend to cause the propellant to separate from itself or the case of the rocket motor and flow to the rear. It has been found that internal operating pressure which exerts a forwardly directed force on the burning surface of the propellant is sufficient to prevent these occurrences in a wide range of rocket motor applications. As a result of this invention, it is now possible to use putty propellants in a manner in which separation of the propellant and the case is prevented, stress and strain differentials between the propellant and the case are relieved and deformation of the initial burning surface of the motor is avoided. Slump restraining means such as illustrated by members 14 and 15 could, of course, be used in other embodiments of rocket motors instead of the means shown as 7 in FIG. 1.

Figure 2:
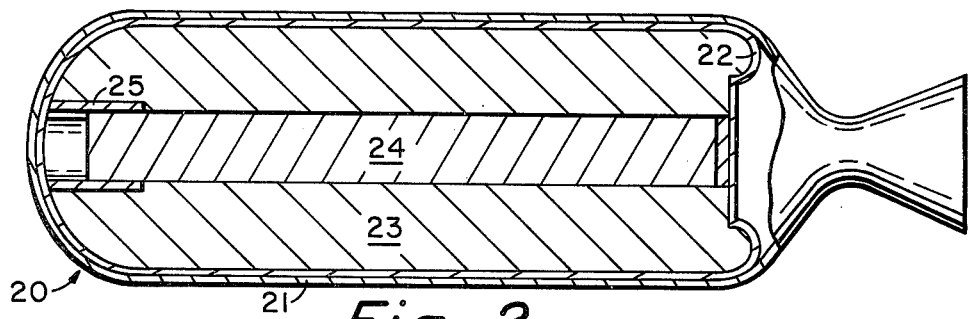
FIG. 2 is a cross section of another embodiment of this invention.

Another embodiment of this invention is illustrated in FIG. 2 wherein a rocket motor shown generally as 20 comprises a propellant containing bag 21 formed at its forward end into a rolling seal convolute configuration 22. This bag contains two different propellant compositions namely a fluid propellant 23 which surrounds a plug of cured solid propellant 24. It is preferable that these two compositions have similar densities to reduce the tendency of the solid to float or sink. The solid propellant grain 24 is affixed to the rearward end of bladder 21 and is slidably mounted within a support sleeve 25 at the forward end of the case. In operation the plug of solid propellant 24 permits longitudinal expansion of the bladder 21 by sliding within the sleeve 25 at the same time the affixation to the forward end of the bag 21 acts as an antislump support for the face. The motor could be ignited by any conventional means known to the art and in operation this particular embodiment would not require the expulsion of any particular portion of the device through the nozzle.

Figure 3:
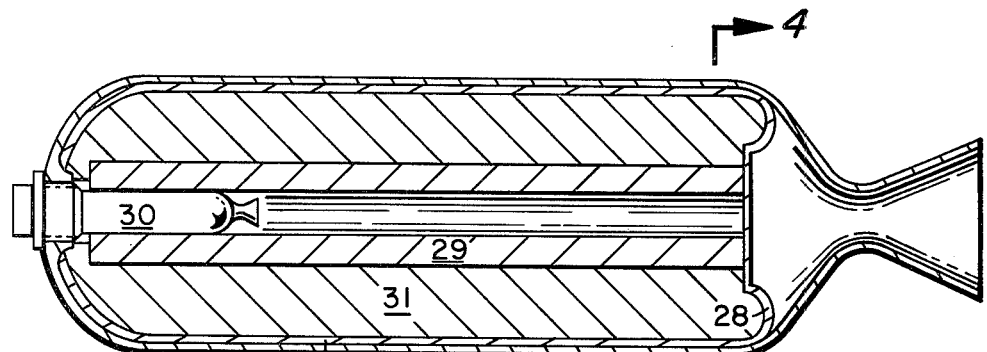
FIG. 3 is a cross section through an internal burning embodiment of this invention.
Figure 4:
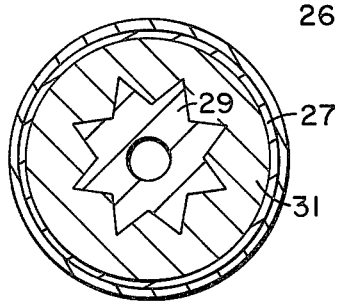
FIG. 4 is a view along line 4—4 of FIG. 3.

FIGS. 1 and 2 have been directed to end burning configurations. It is also possible to utilize the concepts of this invention in the fabrication of an internal burning rocket motor. Referring now to FIG. 3, an internal burning rocket motor using a putty propellant is illustrated as a rocket motor 26 having a putty propellant bag 27 mounted within the combustion chamber, the bag being formed at its rearward end into a rolling seal convolute portion 28 substantially as described heretofore. In order to permit the formation of the proper internal burning port, a mandrel 29 of some readily destructible, frangible or consumable material, such as styrofoam or combustible fuse, for example, having an external configuration corresponding to the initial burning surface desired (a multi-pointed star being illustrated) is mounted within the motor casing and the bag in sliding relationship to a support 30 which for this embodiment is illustrated as being the igniter for the system. The putty propellant 31 surrounds the mandrel in the bag. During storage the sliding mandrel permits longitudinal expansion and contraction of the grain and the forward end of the removal mandrel affixed to the bladder 28 prevents slump. Upon ignition of igniter 30 the mandrel is consumed almost immediately and ignition occurs on the internal burning surface. The internal pressure generated within the rocket motor is adequate to keep the propellant 31 from debonding from the face of the motor and for typical putty propellant situations, the initial configuration is maintained during the extremely short burn time encountered. While FIG. 3 uses an inert mandrel, it is readily apparent that the mandrel 29 could be substituted by a plug of solid propellant having the desired internal configuration and cured to the required stiffness. Thus, on ignition the initial burning surface would be provided by the solid propellant grain and the frame propagated to the putty propellant after the consumption of the solid propellant mandrel.

The invention has been described with respect to certain specific embodiments thereof, however, it should not be construed as being limited thereto. For example, while the rolling seal convolute method of closing the end of the bag containing the propellant has been described as a simple and effective manner of accomplishing this particular function, other devices could also be employed. For example, the propellant could be retained within the combustion chamber by means of a sliding partition which is mounted in sliding sealing relationship to the case. This partition would form both the sealing function and the slump support function of the device of the above described embodiments, but in many cases sliding contact between members in a propellant environment is undesirable because of the hazards associated with frictional ignition. Also the means to prevent slump and the means to permit axial motion may be combined into one structural element. For example, in small diameter rocket motors, the aft end of the receptacle 4 between convolute 6 can be made sufficiently thick and stiff as to eliminate the requirement for separate support means 8, 9 and 10.

Additional means may also be provided to prevent slump of the burning surfaces after ignition has occured. The rate of slump is proportional to the unsupported area and thus, the larger the diameter of the rocket motor or of the unsupported burning surface the more rapidly will slump occur. In large diameter motors or in motors in which the viscosity is low, it may, therefore, be desirable to decrease the unsupported area of the propellant. This can be very readily accomplished, for example, by inserting a foil grid-work in the propellant. Since the grid is embedded within the propellant, it will not be required to sustain any substantial loads but will operate to reduce the effective area of the unsupported surfaces thereby sharply reducing the rate of slump. The material used for the grid should be combustible and sufficiently rigid so that it does provide some support. Various other modifications may be made without departing from the scope of this invention which is limited only by the following claims wherein:

We claim:

1. A rocket motor utilizing a flowable propellant in a non-flowing combustion mode comprising:
   a. a combustion chamber;
   b. a mass of flowable propellant disposed within said combustion chamber said mass of propellant having a rear surface spaced apart from the aft end of said combustion chamber whereby said propellant is free to expand rearwardly within said combustion chamber;
   c) a flexible membrane disposed about said propellant and containing at least said rear surface, said membrane and said propellant being formed into an annular rearwardly convex convolute around the rear surface of said propellant;
   d. anti-slump means supported axially within said combustion chamber and slidable axially therein said anti-slump means supportingly engaging said membrane whereby the configuration of the rear surface of said propellant mass is maintained while axial expansion and contraction of said propellant mass is permitted.

2. The apparatus of claim 1 wherein said anti-slump means comprises a solid member embedded within said flowable propellant and the external surface of said member defining the initial internal burning surface of said mass of flowable propellant.

* * * * *